United States Patent [19]

Howard, Jr.

[11] 4,126,647

[45] Nov. 21, 1978

[54] ETHYLENE POLYMER/ACRYLONITRILE POLYMER COMPOSITES

[75] Inventor: Edward G. Howard, Jr., Hockessin, Del.

[73] Assignee: E. I. Du Pont de Nemours and Company, Wilmington, Del.

[21] Appl. No.: 808,394

[22] Filed: Jun. 20, 1977

[51] Int. Cl.$^2$ ............................................. C08L 23/08
[52] U.S. Cl. ............................. 260/878 R; 260/42.14;
260/897 B; 428/265; 428/394; 428/520; 428/522
[58] Field of Search ................. 260/897 B, 878, 42.14; 428/394

[56] References Cited

U.S. PATENT DOCUMENTS

| | | | |
|---|---|---|---|
| 2,841,569 | 7/1958 | Rugg et al. | 260/897 X |
| 3,950,303 | 4/1976 | Lipscomb | 260/42.14 |

FOREIGN PATENT DOCUMENTS 2,459,118  1/1974  Fed. Rep. of Germany.

838,028  6/1960  United Kingdom.

*Primary Examiner*—Carman J. Seccuro

[57] ABSTRACT

Solid, homogeneous, ethylene polymer/acrylonitrile polymer composites which comprise
(a) about 5 to about 65% by weight of a high molecular weight ethylene polymer such as polyethylene, and
(b) about 35 to about 95% by weight of a solid acrylonitrile polymer such as polyacrylonitrile powder or fiber, in which essentially all of the ethylene polymer is polymerized onto the surface of the acrylonitrile polymer and essentially all of the acrylonitrile polymer has ethylene polymer polymerized onto its surface are prepared by polymerizing ethylene onto the surface of the acrylonitrile polymer in the presence of a hydrocarbon-soluble, organo-transition metal compound such as tetrabenzylzirconium and an organoaluminum compound such as triisobutylaluminum. Composites in which the acrylonitrile polymer is in the form of a fabric are particularly useful for the preparation of laminates.

22 Claims, No Drawings

ETHYLENE POLYMER/ACRYLONITRILE POLYMER COMPOSITES

BACKGROUND OF THE INVENTION (1) Field of the Invention

This invention relates to ethylene polymer/acrylonitrile polymer composites. More particularly, it relates to composites containing ethylene polymer polymerized onto the surface of a powdered or fibrous acrylonitrile polymer. It also relates to molded laminates made from ethylene polymer/acrylonitrile polymer fabric composites.

(2) Description of the Prior Art

The utility of organic polymers has been broadened in recent years to the degree that rigid polymers such as the nylons, ABS (acrylonitrile/butadiene/styrene) and polyacetal resins have begun to replace the more conventional metal, wood and ceramic materials. The lower cost of polyolefins such as polyethylene could make them candidates for a wider range of applications if certain properties such as heat deflection temperature, stiffness and hardness could be improved. Much research has been directed toward methods of improving these properties, mostly by filling polyolefins with finely-divided solids or fibrous fillers. The addition of fillers to polyolefins also serves to extend the use of polyolefins.

One such method which has led to composites of outstanding physical properties is described in German Patent Publication OLS No. 2,459,118. This publication describes homogeneous polyolefin/inorganic filler composites which comprise (a) about 10–75% by weight of polyolefin having an inherent viscosity of at least about 4, and (B) about 25–90% by weight of finely-divided, inorganic filler compound having catalytically-active, transition metal compound interacted at its surface, in which the polyolefin is polymerized onto the surface of the filler in the presence of an organoaluminum compound. There is no mention of organic fillers in this publication.

One of the areas in which polyolefins have not been useful heretofore is in the area of reinforced polymer laminates. Such laminates have heretofore been prepared by working a prepolymer of syrup-to-paste consistency such as a polyester prepolymer into a layup composed of alternate layers of a reinforcing fabric such as fiberglass and the prepolymer, and further polymerizing the prepolymer by application to heat to form solid polymer. Since polyolefins do not have a prepolymer form they have not heretofore been suitable for this use. Accordingly, it would be desirable to provide a method of forming reinforced laiminates from inexpensive polyolefins.

SUMMARY OF THE INVENTION

This invention is based on the discovery that composites containing about 5 to about 65% by weight of a high molecular weight ethylene polymer and about 35 to about 95% by weight of a solid acrylonitrile polymer in which essentially all of the ethylene polymer is polymerized onto the surface of the acrylonitrile polymer and essentially all of the acrylonitrile polymer has ethylene polymer polymerized onto its surface are highly useful for preparing compression molded objects. These composites are prepared by polymerizing ethylene or a mixture of ethylene and a comonomer onto the surface of the acrylonitrile polymer in the presence of a hydrocarbon-soluble, organo-transition metal compound and an organoaluminum compound. When the acrylonitrile polymer is in the form of fabric, the resulting composite composed of ethylene polymer coated fabric is useful for preparing hot pressed laminates.

DETAILED DESCRIPTION OF THE INVENTION

The German Patent Publication cited above teaches that improved results are obtained when filled polyolefins are prepared by polymerizing the olefin onto the surface of the inorganic filler. In attempting to extend this concept to organic polymers as fillers, it has been found that ethylene polymerizes erratically at best and sometimes not at all on the surface of polyesters and polyamides. Accordingly, it is surprising that ethylene polymerizes readily and reproducibly on the surface of acrylontirile polymers.

The composites of this invention contain about 5 to about 65% by weight of ethylene polymer. At least about 5% by weight of ethylene polymer is necessary to provide sufficient binder to form tough molded objects. The minimum amount of ethylene polymer necessary in any specific case will depend on the particle size and form of the acrylonitrile polymer. With larger particle sizes and fibers, less ethylene polymer is needed. Preferably the composite contains about 7 to about 60% and preferably about 9 to about 55% by weight of ethylene polymer.

The ethylene polymers which are useful in accordance with this invention are polyethylene and copolymers of ethylene containing up to about 15% by weight of units derived from one or more 1-alkenes of 3 to 10 carbons. Suitable comonomers include propylene, 1-butene, 1-pentene, 3-methyl-1-butene, 4-methyl-1-pentene, 1-hexene, 1-octene, 1-decene, and mixtures thereof. Other monomers known to be reactive in coordination polymerization reactions, for example, linear nonconjugated diolefins such as 1,4-hexadiene, 1,6-octadiene, dicyclopentadiene, norbornene and norbornene derivatives such as ethylidenenorbornene, may also be added in small amounts. The preferred ethylene polymer is polyethylene. By "polyethylene" is meant ethylene homopolymer.

The ethylene polymers which are useful in accordance with this invention are solids of high molecular weight, that is, they have an inherent viscosity of at least about 8, and preferably at least about 12. The term "inherent viscosity" refers to inherent viscosity determined by the standard procedure outlined below.

The composites of this invention also contain about 35 to about 95% by weight of a solid acrylonitrile polymer. The acrylonitrile polymers which are useful in accordance with this invention are polyacrylonitrile and copolymers of acrylonitrile containing not more than about 15%, and preferably less than about 10%, by weight of units derived from one or more ethylenically unsaturated comonomers. By "polyacrylonitrile" is meant acrylonitrile homopolymer.

Comonomers containing one ethylenically unsaturated group per molecule which are useful in preparing acrylonitrile copolymers include acrylate esters, such as methyl acrylate, ethyl acrylate, the propyl acrylates, the butyl acrylates, the amyl acrylates, the hexyl acrylates, cyclohexyl acrylate, phenyl acrylate, the octyl acrylates and the like; methacrylate esters, such as methyl methacrylate, ethyl methacrylate, the propyl methacrylates, the butyl methacrylates, the amyl methacrylates, the hexyl methacrylates, cyclohexyl methacrylate, phenyl methacrylate, the decyl methacrylates, and the like; vinyl esters such as vinyl acetate, vinyl propionate, the vinyl butyrates, vinyl benzoate, isopropenyl acetate, and the like; vinyl aromatics such as styrene, alpha-methylstyrene, vinyltoluene, the vinylxylenes, the vinylnaphthalenes, isopropenylbenzene, styrenesulfonic acids, and the like; vinyl amides, such as acrylamide, methacrylamide, N-methylacrylamide, vinylbenzamide, N-vinylpyrrolidone, and the like; vinyl halides, such as vinyl chloride, vinyl bromide, vinyl fluoride, vinylidene chloride, vinylidene fluoride, dichlorodifluoroethylene, tetrafluoroethylene, and the like; and olefins, such as ethylene, propylene, isobutylene, butene-1 and the like.

Comonomers containing at least two ethylenically unsaturated groups per molecule which are useful in preparing acrylonitrile copolymers include allyl acrylate, allyl methacrylate, diallyl maleate, diallyl fumarate, ethylene glycol dimaleate, diallyl itaconate, methallyl acrylate, tetramethylene diacrylate, divinyl ether, the divinyl ether of 1,4-butanediol, diallyl ether, dimethallyl ether, ethylene glycol dimethacrylate, 1,1,1-trimethoxypropane dimethacrylate, glyceryl triacrylate, sucrose hexaacrylate, diallyl phthalate, triallyl cyanurate, 2,2,5,5-tetramethyl-1,5-hexadiene, 1,5-hexadiene, 1,6-heptadiene, 1,7-octadiene, 1,8-nonadiene, divinylbiphenyl, divinylnaphthalene, divinylbenzene, trivinylbenzene, diallylbenzene, diisopropenylbenzene, allyl allyloxyacetate, ethylidene dimethacrylate, methylene dimethacrylate, diallylmelamine, diallylisomelamine, triallylmelamine, triallyl aconitate, triallyl phosphate, tetraallylsilane, tetravinylsilane, diallyldivinylsilane, tetraallylgermane, tetravinyltin, tetravinylgermane, triacryloylperhydrotriazine, trimethacryloylperhydrotriazine, methylene-bis-acrylamide, ethylene diacrylamine, N-allylacrylamide, N,N-diallylacrylamide, N,N-dimethallylmethacrylamide, polyallyl ethers of polyhydric alcohols such as tetraallylpentaerythritol, hexaallylsucrose, hexa-allylinositol, hexa-allylsorbitol, hexavinylsucrose, and the like.

The composition limits of the products of the invention are governed by the following considerations. In the areas of high acrylonitrile polymer content, there should be enough ethylene polymer present in the composite to help coalesce the powdered or fibrous composite to a sheet upon molding thereby providing the desired amount of stiffness. In the area of relatively low acrylonitrile polymer content, there must be enough acrylonitrile polymer to provide the desired amount of stiffness. These considerations are especially important in making laminates from composites in fabric form. Preferably the composites of the invention will contain about 40% to about 93% acrylonitrile polymer, and most preferably about 45% to about 91% acrylonitrile polymer.

The composites of this invention are homogeneous, that is, essentially all of the ethylene polymer is polymerized onto the surface of the acrylonitrile polymer and essentially all of the acrylonitrile polymer has ethylene polymer polymerized onto its surface. By the term "essentially all" it is meant that the amount of acrylonitrile polymer-free ethylene polymer and ethylene polymer-free acrylonitrile polymer present is not sufficient to materially alter or detract from the basic and novel characteristics of composites which are 100% homogeneous. In other words, these terms exclude acrylontirile polymer-free ethylene polymer and ethylene polymer-free acrylonitrile polymer in amounts which prevent the advantages of this invention from being realized.

Optionally and preferably the acrylonitrile polymer is treated with phosphoric acid before the ethylene polymerization step. This treatment frequently, but not always, results in significantly faster polymerization of ethylene onto the surface of the acrylonitrile polymer. The treatment is conveniently accomplished by soaking the acrylonitrile polymer in a dilute solution of phosphoric acid in ether.

Before the acrylonitrile polymer can be used in the polymerization reaction, it must first be freed of gaseous oxygen, water and other polar impurities that interfere with the polymerization reaction. This is readily accomplished by sweeping the acrylonitrile polymer with an inert gas such as nitrogen with heating.

The polymerization is carried out by first adding the acrylonitrile polymer and an inert, liquid hydrocarbon diluent to the polymerization reactor. Suitable inert, liquid hydrocarbon diluents for use as the polymerization medium include aromatic, saturated aliphatic, and saturated alicyclic hydrocarbons. While the liquid cyclic and acyclic hydrocarbons of 5 to 10 carbons such as pentane, hexane, heptane, octane, decane, cyclohexane, benzene, toluene, xylene and tetralin are preferred, the lower boiling propanes and butanes can also be used.

The diluent should be anhydrous and preferably is made so by passing it through highly absorptive alumina such as a Woelm acid alumina column immediately prior to use. The liquid diluents can also be freed of contaminants such as oxygen and water by treatment with traces, e.g., about 0.50%, based on the weight of diluent, of the organoaluminum compound to be used as a catalyst component in the polymerization. This, along with the acid alumina treatment, ensures maximum avoidance of moisture and other impurities.

The homogeneous composites of this invention are prepared by polymerizing ethylene onto the surface of the acrylonitrile polymer in the presence of a catalytically-active, hydrocarbon-soluble, organo-transition metal compound and an organoaluminum compound. By "hydrocarbon-soluble" is meant an organo-transition metal compound which is soluble in at least one hydrocarbon solvent, or can be solubilized in such solvent by the presence of an organoaluminum compound. By "transition metal" is meant a metal of Group IV$a$, V$a$ or VI$a$ of the Periodic Table published in Advanced Inorganic Chemistry by Cotton and Wilkinson, 3rd edition (1972), Interscience Publishers. These metals are titanium, zirconium, hafnium, vanadium, niobium, tantalum, chromium, molybdenum and tungsten.

The hydrocarbon-soluble, organo-transition metal compounds used in accordance with this invention are of the formula $$L_nMX_p$$

wherein L is an organic ligand bonded to M by carbon, oxygen, or nitrogen; M is a transition metal; X is a non-organic ligand, preferably halogen, $n$ is an integer from 1 to the highest valence of M; and $p$ is an integer of from 0 to 1 less than the highest valence of M. Suitable L groups include hydrocarbyl such as alkyl and alkenyl, substituted hydrocarbyl such as substituted alkyl and substituted alkenyl, hydrocarbyloxy, hydrocarboncarbonyloxy, hydrocarbylsilylhydrocarbyl, dihydrocarbylamino, β-diketonato, and the like.

Illustrative classes of suitable hydrocarbon-soluble, organo-transition metal compounds include tetrabenzylzirconium and related tetrabenzyl, tetrakis(substituted benzyl), and tetranaphthyl derivatives of titanium, zirconium, and hafnium disclosed by Long in U.S. Pat. Nos. 3,635,935, Pioli et al. in 3,681,317, and Candlin et al. in 3,738,944; tetrakis(trimethylsilylmethyl)zirconium and related compounds disclosed by Candlin et al. in 3,738,944; tetraneophylchromium and the related tetrahydrocarbylchromiums disclosed by Kruse in 3,798,250; and tetraneophylzirconium disclosed by Setterquist in 3,932,307.

A preferred class of hydrocarbon-soluble, organo-transition metal compounds are those in which some or all of the L groups are substituted alkyl groups of the formula $$-CH_2Y$$

in which Y represents an atom or group capable of interaction with the vacant d-orbitals of the metal M. Suitable Y groups include aromatic groups such as phenyl, naphtyl, substituted phenyl and substituted naphthyl groups, and groups of the formula $$M'(R)_3$$

in which M' is carbon or silicon, and R, alike or different, is hydrocarbyl such as alkyl or aryl.

Specific hydrocarbon-soluble, organo-transition metal compounds include tetrabenzylzirconium, tetrabenzyltitanium, tetrabenzylhafnium, tetraneophylzirconium, tetraneophylchromium, tetraneophyltitanium, tetrakis(p-isopropylbenzyl)titanium, tetratolyltitanium, tetrakis(tetraethylbenzyl)titanium, tetramethyltitanium, tetraneopentylzirconium, tetraneopentyltitanium, tetraneopentylhafnium, tetrakis(p-methylbenzyl)zirconium, tetrakis(1-naphthylmethyl)titanium, tetrakis(trimethylsilylmethyl)zirconium, tribenzylzirconium chloride, tris($\pi$-allyl)zirconium bromide, tris($\pi$-methallyl)-titanium chloride, tetrakis($\pi$-allyl)hafnium, tetrakis($\pi$-allyl)chromium, tetrakis($\pi$-allyl)niobium, chromium octoate, chromium naphthenate, tetrakis(2,4-pentanedionato)zirconium, tetrakis(2,4-pentanedionato)titanium, tetrakis(dimethylamino)titanium, tetrakis(diethylamino)vanadium, and the like.

The amount of hydrocarbon-soluble, organo-transition metal compound added to the polymerization reaction should be about 0.00001 to about 0.1 millimole of organo-transition metal compound per gram of acrylonitrile polymer, and preferably about 0.0001 to about 0.01 millimole. This amount will provide acrylonitrile polymer having interacted at is surface sufficient organo-transition metal compound to provide about 0.000001 to about 0.1 milligram-atom of transition metal per gram of acrylonitrile polymer, and preferably about 0.00001 to about 0.01 milligram-atom.

The preferred and most active hydrocarbon-soluble, organo-transition metal compounds are the zirconium compounds. Preferably the polymerization reaction is carried out in the presence of an amount of zirconium compound equivalent to about 0.0005 to about 0.005 milligram-atom of zirconium per gram of acrylonitrile polymer.

The polymerization process used to prepare the composites of this invention also includes as part of the coordination catalyst system an organoaluminum compound selected from the group consisting of trialkylaluminums ($R^1R^2R^3Al$), dialkylaluminum hydrides ($R^1R^2AlH$), dialkylaluminum alkoxides ($R^1R^2AlOR^3$), alkylaluminum halides ($R^1R^2AlX$ and $R^1AlX_2$) and polymeric hydrocarbylaluminums in which the alkyl groups, alike or different, have 1 to about 10 carbons each. Suitable compounds include the commercially available trimethylaluminum, triethylaluminum, tri-n-propylaluminum, triisobutylaluminum, tri-n-hexylaluminum, tri-n-octylaluminum, tri-n-decylaluminum, diethylaluminum hydride, diisobutylaluminum hydride, diethylaluminum ethoxide, diisobutylaluminum ethoxide, and the like. Polymeric hydrocarbylaluminums such as aluminumisoprene polymers are described in U.S. Pat. No. 3,149,136. The trialkylaluminums and dialkylaluminum hydrides are preferred. The alkylaluminum halides are not preferred since the final polymer is corrosive to metal in many applications. Preferably the composites of this invention are free of residual halogen and thus noncorrosive. The organoaluminum compound should be present in an amount which provides a mole ratio of organoaluminum compound to transition metal compound of about 1000:1 to about 4:1, and preferably about 40:1 to about 10:1.

In order to prepare the homogeneous composites of this invention two phenomena must take place during the polymerization. First of all, essentially all of the ethylene polymerization must occur on the surface of the acrylonitrile polymer rather than in solution. This is accomplished by using a hydrocarbon-soluble, organo-transition metal compound. These compounds, in combination with the organoaluminum compound, are essentially inactive as ethylene polymerization catalysts in solution, but, when adsorbed onto the surface of the acrylonitrile polymer, are active as ethylene polymerization catalysts.

The second phenomenon which is essential to preparing homogeneous composites is that polymerization must take place on essentially all of the acrylonitrile polymer. If the catalyst is very active and is readily absorbed by the acrylonitrile polymer, as for example in the case of tetrabenzylzirconium, care must be taken that the relatively small amount of catalyst required is not all adsorbed by only part of the acrylonitrile polymer. This can be accomplished by arranging the order of addition such that initial contact for either the acrylonitrile polymer of the organo-transition metal compound is with the organoaluminum compound rather than with each other. Initially contacting the acrylonitrile polymer with the organo-transition metal compound, in most cases, leads to a heterogeneous product and should be avoided.

Initial contact between the acrylonitrile polymer and the organo-transition metal compound can be avoided by proceeding in one of two ways. In accordance with one method, the acrylonitrile polymer is first reacted with a large excess of the organoaluminum compound. The organo-transition metal compound is then added. The mole ratio of organoaluminum compound to organo-transition metal compounds should be in the range of about 1000:1 to about 4:1, and preferably about 40:1 to about 10:1.

In accordance with another and preferred method of avoiding initial contact between the acrylonitrile polymer and the organo-transition metal compound, the transition metal compound is first reacted with a large excess of the organoaluminum compound in amounts which provide a mole ratio of organoaluminum compound to organo-transition metal compound of about 1000:1 to about 4:1 thereby forming a complex. The acrylonitrile polymer in the hydrocarbon diluent is then contacted with the complex.

The polymerization reaction can be carried out at temperatures of about 0° to about 250° C. Polymerization temperatures below that at which the diluent swells the ethylene polymer are preferred since swelling greatly increased the viscosity of the reaction mixture and makes agitation difficult or impossible unless low concentrations of materials are used. For practical reasons, polymerizations should be run at temperatures not in excess of about 100° C. when pure alkanes or cycloalkanes are used. When a strong ethylene polymer solvent such as benzene, toluene, tetralin or xylene is used, even lower temperatures such as about 60° C. or below should be used. Preferably temperatures of about 25° to about 100° C. are used, and most preferably about 50° to about 90° C.

Polymerization is readily carried out at pressures from about atmospheric to about 500 atmospheres. Pressures in the lower range are generally preferred, and about 3–70 atmospheres are more satisfactory. The course of the polymerization reaction is followed by noting the change in weight of the supply vessel containing the ethylene. The supply vessel is normally used to maintain the pressure in the reaction vessel. Reaction times may vary over a wide range, for example, from a few seconds to about 24 hours.

The composites of this invention are formed into useful articles by various molding techniques. These techniques generally involve subjecting the composite to a temperature at which the composite softens in the range of about 105° to about 250° C. and a positive pressure of about 10 to about 100,000 psi or more. The temperature selected in any specific case will depend on the particular ethylene polymer and acrylonitrile polymer used. In general, temperatures of about 150° to about 225° C. and pressures of about 1000 to about 15,000 psi are preferred.

A useful means of forming articles from the composites of this invention is by compression molding, which involves the simultaneous application of heat and pressure. This operation can be carried out by filling a mold with the composite, and pressing the composite in the mold with application of heat sufficient to raise the temperature above the softening point of the ethylene polymer. Temperatures of about 150° to about 225° C. and positive pressures of about 10 to about 5000 psi, and preferably of at least about 1000 psi, are suitable. When the formed article has cooled below the melting point of the ethylene polymer, the mold is opened and the article is removed.

When the composites of this invention are in powder form, they are amenable to a powder molding technique which involves cold compressing in a mold followed by sintering. The powder is placed in a mold and compressed at a pressure of about 100 to about 100,000 psi, preferably at least about 1,000 psi, and most preferably, at least about 5,000 psi, at a temperature below the melting point of the polymer to form self-supporting articles. The article is then removed from the mold and densified by heating at a temperature above the softening point of the composite, e.g., about 105° to about 225° C., to form the finished article.

The composites of this invention which are in powder form are also useful for coating a wide variety of substrates by conventional powder-coating techniques. In accordance with these techniques, for example, a substrate can be heated and then dipped into a fluidized bed of the composite powder. The power will adhere to the hot substrate because of the adhesive character of the softened composite. The powder coating is then coalesced by sintering. This technique is useful for wire coating and the like.

When the acrylonitrile polymer is in the form of a woven or nonwoven fabric, the composite can be formed into laminates by laying up a multiplicity of fabric layers and hot pressing the layup. Suitable temperatures for hot pressing the layup are about 125° to about 225° C., and preferably about 150° to about 200° C. Suitable pressures for hot pressing the layup are about 500 to about 5000 psi.

The molded articles prepared from the composites of this invention have two advantages, namely low density and relatively low cost. These articles, especially laminates from fabric composites, are useful in applications where light weight is important such as reinforced containers for air-freight cargoes and circuit boards for electronic apparatus. The densities of these laminates are between about 1.0 and 1.1, depending on the composition. By contrast, a typical glass fiber/polyester laminate has a density of about 2.3. Another advantage of these laminates is that they will not collapse if overheated, since the acrylonitrile polymers used in accordance with this invention do not melt on heating.

Determination of Inherent Viscosity

Inherent viscosity is measured by the following procedure except where otherwise noted: A sample of the composite calculated to contain 0.025 g of ethylene polymer is placed in a closed flask containing a magnetic stirring bar and adapted for insertion of a thermometer and a condenser containing a nitrogen purge tube. Into this flask is pipetted 50 ml of 1,2,4-trichlorobenzene containing 1.33 g/l of butylated hydroxytoluent antioxidant to give a 0.05 weight/volume percent solution of ethylene polymer.

With the thermometer and condenser in place, nitrogen is slowly passed over the contents of the flask, the magnetic stirrer is started, and the contents of the flask are heated to 180° C. The solution is stirred at this temperature for 2 hours. At the completion of this time, the condenser unit and the thermometer are removed from the flask. A ground glass stopper is inserted into the thermometer-well, a tube to support a capillary viscometer is inserted in the condenser-well, and the entire unit is transferred to an oil bath and maintained at 130° C. A capillary viscometer having three scratch marks, one near the bottom, one above the bulb and one below the bulb is inserted in the support tube.

After 1 hour at 130° C. in the oil bath, the viscometer is adjusted so that the tip is immersed in the solution to the depth indicated by the bottom scratch. Vacuum is gently applied to the top of the viscometer until the solution has risen to a level above the top scratch on the viscometer. The vacuum is removed and the solution is allowed to fall. The flow of the solution between the scratch above the bulb and the scratch below the bulb is timed. This flow time measurement is repeated until three values which check within ± 0.3 second are obtained. The flow time of the pure solvent is also measured at 130° C. in the same way.

The inherent viscosity is calculated using the following equations:

$$\text{Relative Viscosity} = \frac{\text{Time of solution flow}}{\text{Time of solvent flow}}$$

$$\text{Inherent Viscosity} = \frac{\text{natural log of relative viscosity}}{\text{w/v\% polymer concentration}}$$

EXAMPLES OF THE INVENTION

The following examples illustrate the invention. All parts and percentages are by weight unless otherwise specified. Triisobutylaluminum was used as a 1.0 M solution in heptane. Physical properties were determined by the following ASTM test procedures.

| Property | Test Specification |
|---|---|
| Tensile strength, maximum (T) | ASTM D-638-71A |
| Elongation at break ($E_b$) | ASTM D-638-71A |
| Modulus in tension, initial ($M_i$) | ASTM D-638-71A |
| Izod impact strength | ASTM D-256-72A |

Heat deflection temperature (HDT) ASTM D-648-56
In the tensile, elongation and modulus determinations, test bars of Type I and Type V of ASTM test method 638-72 were used.

EXAMPLE 1

Powdered polyacrylonitrile was ball-milled in cyclohexane to break up agglomerates and dried at 100° C. for 18 hours in a stream of nitrogen at 30 liters/hr. From this point up to the start of the polymerization, all operations were carried out under nitrogen. A part of the dried polyacrylonitrile (40 g) was added to a solution of 0.3 mmol of tetraneophylzirconium and 6 mmol of triisobutylaluminum in 600 ml of dry, deoxygenated cyclohexane in an enclosed blender equipped with a high-speed stirrer. The mixture was stirred vigorously, and the resulting dispersion was transferred through polyethylene tubing under nitrogen pressure to a 1-liter stainless steel autoclave equipped with a stirrer. The autoclave had previously been dried at 150° C./0.5 mm for 2 hours, purged with nitrogen at 150° C. for 3 hours, and cooled.

Stirring was started, the mixture was heated to 60° C., ethylene was admitted to a total pressure of 200 psi, and the system was maintained at 60° C. and 200 psi, with repressuring as necessary, until the supply cylinder containing ethylene showed a weight loss of about 40 g in addition to the ethylene that had been used for the initial pressuring (3 hr 37 min). The ethylene supply was shut off, the autoclave was cooled and bled to atmospheric pressure, and the solid was isolated by filtration and dried.

The product was 64 g of a powdery polyethylene/-polyacrylonitrile composite that passed a 16-mesh screen, plus 6 g of larger pieces, which were discarded. Two determinations of nitrogen content gave values of 14.91% and 14.79%. The average, 14.85%, corresponds to 56.3% polyacrylonitrile, or a polyethylene/polyacrylonitrile composition of about 44/56. This agrees well with the approximate composition (57% polyacrylonitrile) calculated from the difference between the weight of the product and the weight of the starting polyacrylonitrile.

Compression molding at 180° C./3000 psi gave a uniform sheet that had the following properties:
Tensile (T): 3214, 3086 psi
Elongation ($E_b$): 276%, 272%
Modulus ($M_i$): 205, 249 kpsi
0° F. Izod impact: 5.1, 4.8 ft lb/in of notch (partial break)

EXAMPLE 2

This Example illustrates treatment of powdered polyacrylonitrile with phosphoric acid.

To a suspension of 120 g of powdered polyacrylonitrile in 1 liter of diethyl ether was added dropwise with stirring under nitrogen a solution of 2 g of 85% phosphoric acid in 200 ml of ether. The suspension was stirred for 2 hours and pressure-filtered under nitrogen. The solid on the filter was washed with ether and dried under nitrogen. It contained 121 ppm (0.0121%) phosphorus.

By essentially the method of Example 1, 33 g of the acid-treated polyacrylonitrile which had been dried further at 150° C. for 18 hours in a stream of nitrogen, 600 ml of cyclohexane, 6 mmol of triisobutylaluminum, and 0.3 mmol of tetrabenzylzirconium were processed with ethylene at 60° C. and 200 psi until the ethylene supply cylinder showed a weight loss of about 40 g. The product was 62 g of a powdery polyethylene/polyacrylonitrile composite that passed a 16-mesh screen, plus 15 g of larger pieces, which were discarded. Two determinations showed 10.95% and 10.97% nitrogen. The average, 10.96%, corresponds to 41.5% polyacrylonitrile, or a polyethylene/polyacrylonitrile composition of about 58/42. The approximate composition by weight difference was 57/43. The inherent viscosity of the polyethylene in the composition, determined as above except that a 0.025 w/v percent solution was used instead of 0.05 w/v percent, was 11.75. The powdered polyacrylonitrile was insoluble in the trichlorobenzene at 130° C.

Heating the product in a mold at 180° C. for 3 minutes, followed by pressing at 180° C. and 3000 psi for 2 minutes, gave a uniform sheet that had the following properties:
Tensile (T): 3207, 3129 psi
Elongation ($E_b$): 200%, 71%
Modulus ($M_i$): 276, 251 kpsi
0° F. Izod impact: 2.4, 2.7 ft lb/in of notch (partial break)

EXAMPLE 3

This example illustrates the preparation of a polyethylene/acrylonitrile polymer composite in the form of a woven fabric. The fabric used was a 1:1 blend (blended in the weaving) of yarns made from (1) an acrylonitrile/2-methyl-5-vinylpyridine/methyl acrylate (88.2-90.2/5.8/4-6) terpolymer and (2) an acrylonitrile/methyl acrylate/4-styrenesulfonic acid (94/6/0.1) terpolymer.

The cooling coils of a 2-gal stainless-steel autoclave were wrapped with 195 g of the woven fabric, after which the autoclave was assembled and heated at 120° C. for 15 hours under a nitrogen purge to dry the vessel and the fabric. The system was cooled to room temperature, and a solution of 36 mmol of triisobutylaluminum and 1.8 mmol of tetrabenzylzirconium in 1.2 gal of dry, deoxygenated cyclohexane was added under nitrogen. Stirring was started, and the system was processed with ethylene at 60° C. and 200 psi by the method of Example 1 until the ethylene supply cylinder showed a weight loss of about 65 g (2 hr 25 min).

When the autoclave was opened, it was found that essentially all the polyethylene had formed on the surface of the fabric, there being essentially none in the cyclohexane. After air-drying, the polyethylene/acrylonitrile polymer fabric composite weighed 229 g; this corresponds, by weight difference, to a polyethylene/acrylonitrile polymer composition of about 15/85.

A smooth, glossy laminate in the form of a plaque was made by cutting pieces of the coated fabric to fit snugly into the press frame of the molding apparatus and hot-pressing at 180° C. and 2000 psi. It had the following properties:
Tensile (T): 8107, 7589 psi
Elongation ($E_b$): 30%, 26%
Modulus ($M_i$): 658, 626 kpsi
0° Izod impact: 6.6, 7.2 ft lb/in of notch (no break)
264-psi Heat Deflection: 80° C., 84° C.

EXAMPLE 4

This Example illustrates treatment of a blended woven fabric of an acrylonitrile polymer with phosphoric acid before the ethylene-polymerization step.

A 600-g roll of the acrylonitrile-polymer blended woven fabric used in Example 3 was placed in a 2-liter cylindrical funnel having a sintered-glass filter disk. The lower exit of the funnel was plugged with a stopper, the cloth was covered with diethyl ether, the system was allowed to stand for 2 hours at room temperature, and the ether was drained from the funnel by removing the stopper. The exit was again plugged, and the cloth was covered with a solution of 20 g of 85% phosphoric acid in 1500 ml of ether. After 2 hours at room temperature the liquid was removed through the filter, and the cloth was washed on the filter with 600 ml of ether. The cloth was then allowed to stand briefly under 1500 ml of ether, the ether was drained off, and the cloth was rinsed once more with 600 ml of ether and dried under nitrogen.

By essentially the method of Example 3, 169.3 g of the treated fabric, 1.8 mmol of tetrabenzylzirconium, 36 mmol of triisobutylaluminum, and 1.2 gal of cyclohexane were processed with ethylene at 50° C. and 200 psi until the ethylene supply cylinder showed a weight loss of about 56 g (57 min). The polyethylene/acrylonitrile polymer composite fabric thus produced weighed 185.3 g; this corresponds, by weight difference, to a polyethylene/acrylonitrile polymer composition of about 9/91.

A laminate made by the method of Example 3 had the following properties:
Tensile (T): 8438, 8319 psi
Elongation ($E_b$): 26%, 27%
Modulus ($M_i$): 618, 602 kpsi
0° Izod impact: 6.7, 7.5 ft lb/in of notch (no break)
264-psi Heat Deflection: 87° C., 84° C.

EXAMPLE 5

By the process of Example 4, 150 g of the treated fabric of Example 4, 1.8 mmol of tetrabenzylzirconium, 36 mmol of triisobutylaluminum, and 1.2 gal of cyclohexane were processed with ethylene at 600° C. and 200 psi for 4 hours. The polyethylene/acrylonitrile polymer fabric composite thus produced weighed 285 g. Two determinations showed 11.44% and 11.26% nitrogen. The average, 11.35%, corresponds to a polyethylene/acrylonitrile polymer composition of about 47/53. The approximate composition by weight difference was also 47/53.

A uniform laminate 150-153 mil thick was made by pressing eleven 3.5 inches 33 6.5 inches layers of the coated fabric at 160° C. and 2000 psi. It had the following properties:
Tensile (T): 5250, 5140 psi
Elongation ($E_b$): 20%, 19%
Modulus ($M_i$): 353, 290 kpsi
0° Izod impact: 6.3, 6.0 ft lb/in of notch
264 psi Heat Deflection: 73° C., 72° C.

EXAMPLE 6

This example illustrates the use of a nonwoven acrylonitrile polymer fabric.

A nonwoven, needled batt of a 96/4 acrylonitrile/4-styrenesulfonic acid copolymer (9 g) was soaked for 20 minutes in a 1% solution of a commercial laboratory glass cleaner in hot water. The batt was agitated briefly in the solution, separated by filtration, and washed on the filter with hot water until it was free of soap. It was then soaked in distilled water overnight, rinsed with distilled water, and air-dried. Then it was soaked overnight in diethyl ether, rinsed with ether, and treated with phosphoric acid by being soaked in a solution of 3 g of 85% phosphoric acid in 1 liter of ether, following the general procedure of Example 4.

By essentially the method of Example 3, the treated batt was placed in a 1-liter autoclave with 6 mmol of triisobutylaluminum, 0.3 mmol of tetrabenzylzirconium, and 600 ml of cyclohexane, and the system was processed with ethylene at 60° C. and 200 psi until the ethylene supply cylinder showed a weight loss of 9 g (1 hr 3 min). The polyethylene/acrylonitrile polymer fabric thus produced weighed 14 g. Three determinations gave 13.74%, 14.13%, and 14.48% nitrogen. The average, 14.12%, corresponds to 55.7% acrylonitrile polymer, or a polyethylene/acrylonitrile polymer composition of about 44/56. The approximate composition by weight difference was 36/64.

A 2 inches × 2 inches plaque 63 mils thick was made by pressing 7 layers of the coated fabric together at 160° C. and 2000 psi. When a cross section of the plaque perpendicular to the planes of the fabric was examined with a microscope (25X), the individual layers corresponding to the original pieces of cloth could not be seen. The plaque had the following properties:
Tensile (T): 7100, 6250 psi
Elongation ($E_b$): 28%, 26%
Modulus ($M_i$): 408, 356 kpsi
0° Izod impact: 3.9, 4.3 ft lb/in of notch (partial break)

EXAMPLE 7

This example illustrates the preparation of a fabric composite of an ethylene/propylene copolymer and an acrylonitrile polymer.

By essentially the method of Example 3, a 1-liter autoclave was charged with 28.6 g of the acrylonitrile polymer woven fabric of Example 3, 6 mmol of triisobutylaluminum, 0.3 mmol of tetrabenzylzirconium, and 400 ml of cyclohexane. The autoclave was then charged with 100 g of propylene, closed, and heated to 60° C., at which temperature the internal pressure was 116 psi. Ethylene was admitted to a total pressure of 166 psi, and the polymerization was conducted as in Example 1 for 4 hours 23 minutes, after which the ethylene supply cylinder showed a weight loss of about 3 g. When first removed from the autoclave and still wet with cyclohexane, the ethylene-propylene copolymer/acrylonitrile the polymer fabric composite had a thin layer of viscous liquid on its surface. This showed that an ethylene/propylene copolymer had in fact been formed. Such copolymers are swollen by cyclohexane, whereas polyethylene is not. The dried fabric composite weighed 34.1 g; this corresponds, by weight difference, to an ethylene polymer/acrylonitrile polymer composition of about 16/84.

A tough laminate was formed by pressing three 2 inches × 2 inches pieces of the coated fabric together at 180° C. It had the following properties:
Tensile (T): 10333, 9608 psi
Elongation ($E_b$): 47.5%, 38.8%
Modulus ($M_i$): 485, 405 kpsi
0° F. Izod impact: 3.5, 3.1 ft lb/in of notch (partial break)

EXAMPLE 8

By essentially the method of Example 3, except that the fabric was wired to the cooling coil of the autoclave instead of simply being wrapped around it, 23 g of the fabric used in Example 3, 6 mmol of triisobutylaluminum, 0.3 mmol of tetrabenzylzirconium, and 600 ml of cyclohexane were processed with ethylene at 60° C. and 200 psi until the ethylene supply cylinder showed a weight loss of about 20 g (27 min). The polyethylene/acrylonitrile polymer fabric composite thus produced weighed 28 g; this corresponds, by weight difference, to a polyethylene/acrylonitrile polymer composition of about 18/82. Two nitrogen determinations showed 22.94% and 23.13% nitrogen. The average, 23.03%, corresponds to a polyethylene/acrylonitrile polymer composition of about 5/95. Note that the composition by weight gain differs considerably from the composition by nitrogen analysis.

Twelve 3 inches × 3 inches pieces of the fabric composite were pressed at 160° C. and 2000 psi to give a 92-mil laminate that was stiff and very uniform. The pattern of the original cloth could be clearly seen. The laminate had the following properties:
Tensile (T): 7831, 7862 psi
Elongation ($E_b$): 32%, 34%
Modulus ($M_i$): 570, 491 kspi
0° F. Izod impact: 9.7, 11.1 ft lb/in of notch (no break)

I claim:

1. A solid, homogeneous, ethylene polymer/acrylonitrile polymer composite which comprises
   (a) 5 to 65% by weight of ethylene polymer having an inherent viscosity of at least 8 selected from the group consisting of polyethylene and ethylene copolymers containing up to 15% by weight of units derived from one or more 1-alkenes of 3 to 10 carbons, and
   (b) 35 to 95% by weight of solid filler composed of acrylonitrile polymer selected from the group consisting of polyacrylonitrile and copolymers of acrylonitrile containing not more than 15% by weight of units derived from ethylenically unsaturated comonomers, said composite being prepared by polymerizing ethylene onto the surface of the acrylonitrile polymer in the presence of an organo-transition metal compound, so that essentially all of the ethylene polymer is polymerized onto the surface of acrylonitrile polymer and essentially all of the acrylonitrile polymer has ethylene polymer polymerized onto its surface.

2. The composite of claim 1 in which the ethylene polymer is polyethylene and the acrylonitrile polymer is in fibrous form.

3. The composite of claim 2 which contains 7 to 60% by weight of polyethylene and 40 to 93% by weight of acrylonitrile polymer.

4. The composite of claim 3 in which the acrylontrile polymer contains less than 10% by weight of units derived from ethylenically unsaturated comonomers.

5. The composite of claim 4 in which the polyethylene has an inherent viscosity of at least 12.

6. The composite of claim 5 which contains 9 to 55% by weight of polyethylene and 45 to 91% by weight of acrylonitrile polymer.

7. The composite of claim 6 in which the acrylonitrile polymer is in the form of a fabric.

8. The composite of claim 6 in which the acrylonitrile polymer is polyacrylonitrile.

9. The method of preparing a solid, homogeneous, ethylene polymer/acrylonitrile polymer composite which comprises
   (A) contacting
       (1) filler composed of acrylonitrile polymer selected from the group consisting of polyacrylonitrile and copolymers of acrylonitrile containing not more than 15% by weight of units derived from one or more ethylenically unsaturated comonomers, and
       (2) 0.001 to 1.0 millimole, per gram of acrylonitrile polymer, of organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each,
   in an inert, liquid hydrocarbon diluent;
   (B) adding to the resulting mixture of 0.00001 to 0.1 millimole, per gram of acrylonitrile polymer, of catalytically-active, hydrocarbon-soluble, organo-transition metal compound,
   (C) contacting the resulting mixture with olefin selected from the group consisting of ethylene, and mixtures of ethylene and one or more 1-alkenes of 3 to 10 carbons with agitation at a temperature of 0 to 100° C. and a pressure from atmospheric to 500 atmospheres until a composite containing 5 to 65% by weight of ethylene polymer having an inherent viscosity of at least 8 selected from the group consisting of polyethylene and ethylene copolymers containing up to 15% by weight of units derived from one or more 1-alkenes of 3 to 10 carbons is formed; and
   (D) isolating the resulting ethylene polymer/acrylonitrile polymer composite.

10. The method of claim 9 in which the acrylonitrile polymer is in fibrous form and the mixture is contacted with ethylene until a composite containing 7 to 60% by weight of polyethylene having an inherent viscosity of at least 12 is formed.

11. The method of claim 10 in which the mixture contains 0.002 to 0.2 millimole, per gram of acrylonitrile polymer, of trialkylaluminum and 0.0001 to 0.01 millimole of organo-transition metal compound selected from the group consisting of tetrabenzylzirconium and tetraneophylzirconium.

12. The method of claim 11 in which the acrylonitrile polymer contains less than 10% by weight of units derived from ethylenically unsaturated comonomers and is pretreated with phosphoric acid.

13. The method of claim 12 in which the acrylonitrile polymer is in the form of a fabric and the mixture is contacted with ethylene until a composite containing 9 to 55% by weight of polyethylene is formed.

14. The method of claim 13 in which the organo-transition metal compound is tetraneophylzirconium.

15. The method of claim 13 in which the organo-transition metal compound is tetrabenzylzirconium.

16. The method of preparing a solid, homogeneous, ethylene polymer/acrylonitrile polymer composite which comprises
   (A) reacting organoaluminum compound selected from the group consisting of trialkylaluminums, dialkylaluminum hydrides, dialkylaluminum alkoxides, alkylaluminum halides and polymeric hydrocarbylaluminums in which the alkyl groups, alike or different, have 1 to 10 carbons each with catalytically-active, hydrocarbon-soluble, organo-transition metal compound in an amount sufficient to provide a mole ratio of organoaluminum compound to organo-transition metal compound of 1000:1 to 4:1, thereby forming a complex,
   (B) contacting
      (1) filler composed of acrylonitrile polymer selected from the group consisting of polyacrylonitrile and copolymers of acrylonitrile containing not more than 15% by weight of units derived from one or more ethylenically unsaturated comonomer, and
      (2) the organoaluminum compound-transition metal compound complex in an amount equivalent to 0.001 to 0.1 millimole, per gram of acrylonitrile polymer, of organoaluminum compound and 0.00001 to 0.1 millimole, per gram of acrylonitrile polymer, of organo-transition metal compound in an enert, liquid hydrocarbon diluent;
   (C) contacting the resulting mixture with olefin selected from the group consisting of ethylene and mixtures of ethylene and one or more 1-alkenes of 3 to 10 carbons with agitation at a temperature of 0 to 100° C. and a pressure from atmospheric to 500 atmospheres until a composite containing 5 to 65% by weight of ethylene polymer having an inherent viscosity of at least 8 selected from the group consisting of polyethylene and ethylene copolymers containing up to 15% by weight of units derived from one or more 1-alkenes of 3 to 10 carbons is formed; and
   (D) isolating the resulting ethylene polymer/acrylonitrile polymer composite.

17. The method of claim 16 in which the acrylonitrile polymer is in fibrous form and the mixture is contacted with ethylene until a composite containing 7 to 60% by weight of polyethylene having an inherent viscosity of at least 12 is formed.

18. The method of claim 17 in which the complex is present in an amount equivalent to 0.002 to 0.2 millimole of organoaluminum compound and 0.0001 to 0.01 millimole of organo-transition metal compound per gram of acrylonitrile polymer, the organoaluminum compound is a trialkylaluminum and the organo-transition metal compound is selected from the group consisting of tetrabenzylzirconium and tetraneophylzirconium.

19. The method of claim 18 in which the acrylonitrile polymer contains less than 10% by weight of units derived from ethylenically unsaturated comonomers and is pretreated with phosphoric acid.

20. The method of claim 19 in which the acrylonitrile polymer is in the form of a fabric and the mixture is contacted with ethylene until a composite containing 9 to 55% by weight of polyethylene is formed.

21. The method of claim 20 in which the organo-transition metal compound is tetraneophylzirconium.

22. The method of claim 20 in which the organo-transition metal compound is tetrabenzylzirconium.

* * * * *

UNITED STATES PATENT OFFICE
CERTIFICATE OF CORRECTION

PATENT NO. : 4,126,647
DATED : November 21, 1978
INVENTOR(S) : Edward George Howard, Jr.

It is certified that error appears in the above-identified patent and that said Letters Patent are hereby corrected as shown below:

Column 5, line 22;        "naphtyl" should read --naphthyl--.

Column 6, line 46;        "of" should read --or--.

Column 9, line 22;        This line should appear as the last line in the preceeding table.

Column 12, line 2;        "33" should read --x--.

Column 14, Claim 4, line 1    "acrylontrile" should read

--acrylonitrile--.

Signed and Sealed this

Eighth Day of May 1979

[SEAL]

Attest:

RUTH C. MASON
Attesting Officer

DONALD W. BANNER
Commissioner of Patents and Trademarks